United States Patent
Saito

[19]
[11] Patent Number: 5,900,005
[45] Date of Patent: May 4, 1999

[54] SYSTEM FOR EXTRACTION OF TEXT STRINGS FROM ON-SCREEN COMPUTER WINDOW DISPLAYS USING THE COMPUTER OPERATING SYSTEM IN LIEU OF A CLIPBOARD

[75] Inventor: Takaharu Saito, Tokyo, Japan

[73] Assignee: TechCraft Co., Ltd., Shibuya-ku, Japan

[21] Appl. No.: 08/788,032

[22] Filed: Jan. 23, 1997

[30] Foreign Application Priority Data

May 17, 1996 [JP] Japan ..................................... 8-123038

[51] Int. Cl.⁶ ............................. G06F 17/24; G06F 17/28; G06F 17/27
[52] U.S. Cl. .......................... 707/531; 707/532; 707/535; 704/3; 345/145
[58] Field of Search ................................ 704/3; 707/539, 707/531, 532, 535; 345/145; 382/229

[56] References Cited

U.S. PATENT DOCUMENTS

| | | | |
|---|---|---|---|
| 5,157,763 | 10/1992 | Peters et al. ............................ | 707/530 |
| 5,243,519 | 9/1993 | Andrews et al. ........................ | 704/2 |
| 5,559,542 | 9/1996 | Tsukuda et al. ........................ | 347/58 |
| 5,583,761 | 12/1996 | Shimizu et al. ........................ | 345/338 |
| 5,617,114 | 4/1997 | Bier et al. ................................ | 345/146 |
| 5,623,612 | 4/1997 | Haneda et al. .......................... | 345/326 |
| 5,625,809 | 4/1997 | Dysart et al. ............................ | 707/103 |
| 5,644,775 | 7/1997 | Thompson et al. ........................ | 704/7 |
| 5,666,542 | 9/1997 | Katai et al. .............................. | 707/501 |
| 5,678,039 | 10/1997 | Hinks et al. .............................. | 707/4 |
| 5,694,151 | 12/1997 | Johnston, Jr. et al. .................. | 707/539 |
| 5,784,643 | 7/1998 | Shields .................................... | 395/825 |
| 5,802,539 | 9/1998 | Daniels et al. .......................... | 707/542 |
| 5,815,073 | 12/1996 | Chou ........................................ | 707/536 |
| 5,821,929 | 9/1998 | Gomez et al. ........................... | 340/471 |

Primary Examiner—Mark K. Zimmerman
Assistant Examiner—Jeffrey Allen Rossi
Attorney, Agent, or Firm—Tilton, Fallon, Lungmus & Chestnut

[57] ABSTRACT

A text string extraction system for a computer system having a display, an operating system having an application program interface with text output portion, a cursor for moving on the display, and application programs to be executed on the operating system for outputting text strings onto operating system via the text output portion to display the text strings on the display, the extraction system includes drawing portion for drawing a symbol on a location pointed to by the cursor and having the operating system output a signal to the application program and having the application program output a text string to be re-displayed and input portion for extracting a text string beside the location pointed to by the cursor by receiving the text string to be re-displayed output from the application program thereby supplying the input text string to the operating system via the text output portion for re-displaying.

11 Claims, 11 Drawing Sheets

FIG. 10

(A) THIS IS A PEN.
↑

(B) THIS IS A PEN.

(C) THIS IS A PEN.
↑

THIS : これ

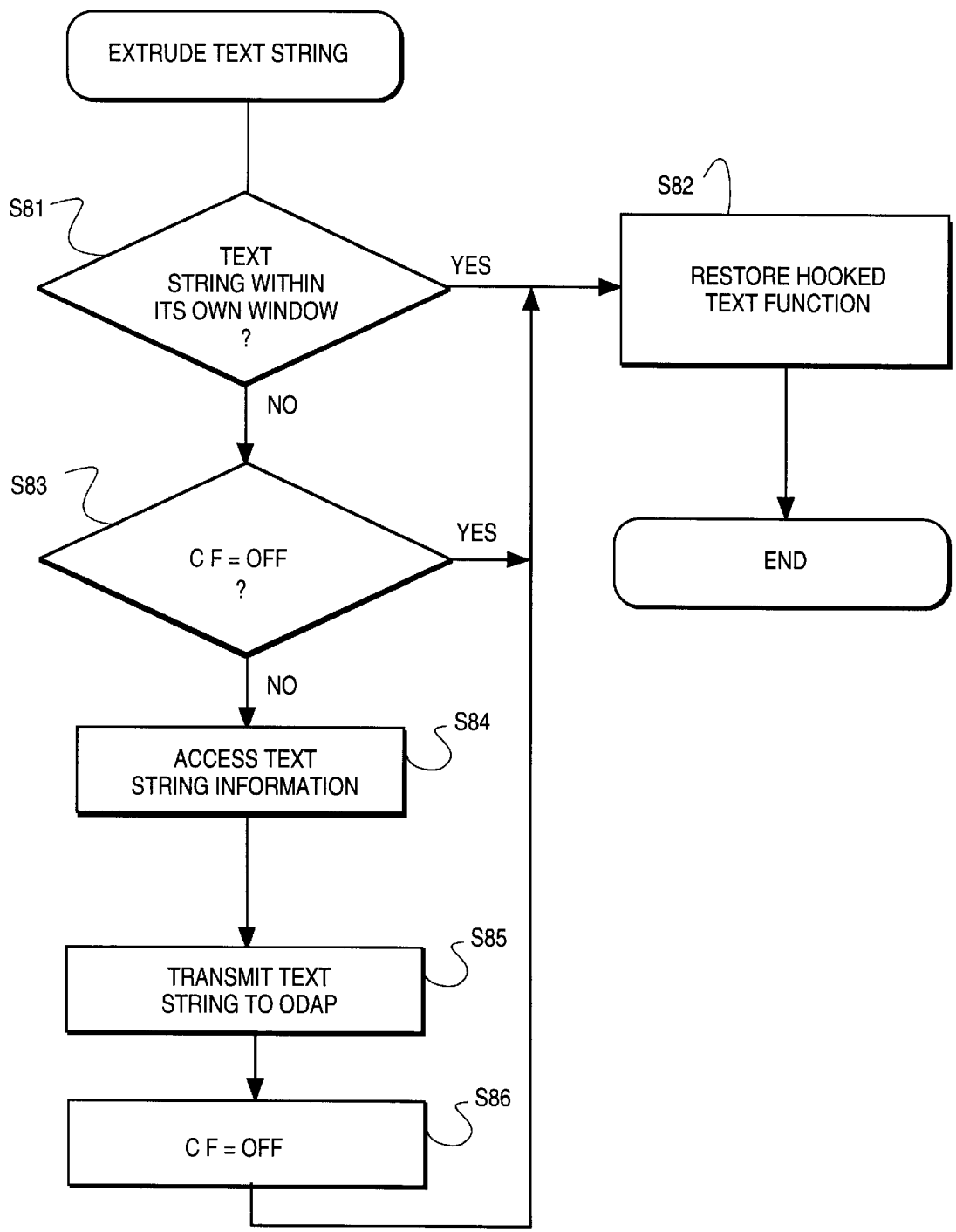

SYSTEM FOR EXTRACTION OF TEXT STRINGS FROM ON-SCREEN COMPUTER WINDOW DISPLAYS USING THE COMPUTER OPERATING SYSTEM IN LIEU OF A CLIPBOARD

BACKGROUND OF THE INVENTION

1. Field of the Invention

The present invention relates to a text string extraction system for extracting a pointed text displaying on screen.

2. Description of the Prior Art

Windows 3.1™ and Windows 95™ are widely-used operating systems, which can perform a multitask operation or a simulated multitask operation. The application software for Windows™ utilize functions of Windows™ system by means of an application program interface (API). Such a multitask operation will be effectively utilized by an application program, e.g., On-line Dictionary Application Program (ODAP), which is able to show "meaning of a word", "a synonym", "antonym", "wording for Japanese", and "spelling of English" etc. When an ODAP is applied in a multitask environment, an executing application program may be in reference to the results from the ODAP.

For example, if a Japanese word-processing program is opened and the ODAP is activated, the ODAP may offer the meanings of a word and a synonym of the word etc., to the word-processing program. Further, if a user applies the Japanese word-processing program for English translation, an English-Japanese ODAP may be effectively used.

Furthermore, if an English word-processing program is opened and an English-Japanese ODAP and a Japanese-English ODAP are also activated, the user may search for relevant words, confirm the meanings of the words, and check the spelling of the words during English translation when he is editing an English task. Additionally, when a world wide web (WWW) browser is executed, an English-Japanese ODAP may be applied to look up the meanings of the words shown on a home page on the Internet's WWW.

However, such a conventional ODAP only accepts the searched words to be transferred from the application program by means of a Clipboard and the searched words have to be delivered into a text-related Windows™ system so as to perform the function of searching.

Additionally, there is a word-processing program provided with an online dictionary function, however, such a program has to first define the scope of the words to be searched then activate the dictionary program or first activate the dictionary program then input the words to be searched.

Thus, the conventional online dictionary systems have to execute a process of pointing a sentence or a word to be searched, the procedure thereof is complicated. Accordingly, there is a need to develop a text string extraction system which can conveniently extract an arbitrary word.

SUMMARY OF THE INVENTION

It is an object of the present invention to provide a text string extraction system capable of conveniently extracting any arbitrary word from an on-screen text.

According to the first aspect of the present invention, there is provided a text string extraction system for a computer system having a display, an operating system means having an application program interface with text output portion, a cursor for moving on the display, and application program means for executing application programs on said operating system and outputting text strings onto said operating system via said text output portion so as to display said text strings on the display, said extraction system includes drawing means for drawing a symbol on a location pointed by the cursor by sending a rectangular matrix to the application program interface then having said operating system means output a signal to said application program and having said application program output a text string to be re-displayed ; and input means for extracting a text string beside said location pointed by the cursor by inputting the text string to be re-displayed output from said application program thereby supplying said input text string to the operating system via the text output portion for re-displaying.

According to the second aspect of the present invention, there is provided with a text extraction system for a computer system having a display, an operating system means having an application program interface with text output portion, and a cursor for moving on the display, application program means for executing an application programs on said operating system and outputting text strings onto said operating system via said text output portion so as to display said text string on the display, said extraction system includes drawing means for drawing a symbol on a location pointed by the cursor by sending a rectangular matrix to the application program interface and having said application program output a text string to be re-displayed on a predetermined address and input means for extracting a text string beside said location pointed by the cursor by inputting the text string to be displayed output on the predetermined address from said application program thereby supplying said input text string to the operating system via the text output portion for re-displaying.

According to the first and second aspects of the present invention, when an application program is displaying text strings, if the cursor is pointing at a suitable location having a text string, drawing means will draw a symbol to the location pointed by the cursor. The application program will output a re-display text string information in response to said "drawing". In general, the text string to be displayed will be supplied to the text output portion of the application program interface of the operating system and the operating system will display the text string.

On the contrary, this invention provides the text string to be displayed to input means, i.e., text extraction means. Accordingly, the extraction means will extract a text string beside, the cursor from the text string.

Then, the text extraction means further provides the input text string to the operating system via the text output portion of the application program interface and the operating system will re-display the text string.

Said drawing means writes an invisible dot matrix to a position pointed to by the cursor. As this drawing operation has to execute with a re-drawing, the application program will output a text string.

Said extraction means will extract a word sandwiched by terminal words such as blank space. Said extracting means also extracts a text string as a desired word to be searched.

According to the third aspect of the present invention, there is provided with a text extraction system for a computer system having a display, application programs for displaying a plurality of text strings on the display; cursor displaying means for displaying a cursor on the display and moving the cursor in response to external operations; re-output means for having said application programs re-output the text string on a predetermined location pointed by said cursor; and extracting means for receiving said text string from said application program in response to said re-output means and extracting said text string besides said cursor based on the inputted text string, the location pointed by said cursor and a predetermined condition of the text string.

According to this configuration, when the application program is displaying text strings and the cursor is pointing at a suitable location, re-output means will have the application program to re-output text string while the extraction means will extract a text string (e.g., word) besides the cursor from said re-output text string based on a predetermined text string condition.

The re-output means includes a writing means for writing a invisible dot matrix on a position pointed by the cursor and means for detecting said writing of dot matrix and having the application program output a text string on the position written with the dot matrix.

The extraction means will extract a word sandwiched by terminal words such as blank space. The present invention is further provided with a dictionary application program for looking up the word extracted from said extraction means and displaying the result.

According to the fourth aspect of the present invention, there is provided with a text extraction system for a computer system having a display, an operating system executing means for executing an operating system having an application program interface with a text output portion for displaying a text string on the display, said extraction system includes a text string extraction portion for replacing with the text output portion of said operating system, receiving a display information from said application program, supplying the received display information to said text output portion and extracting the text string contained within said received display data.

According to this configuration, the text output portion of the application program interface is replaced by the text extraction portion. Thus, as long as the application program outputs an object text string, this text string will be provided to said text extraction portion. Accordingly, any arbitrary text string can be extracted from the object text string.

Additionally, these processes (i.e., programs for extracting text strings) can also be stored in a storage medium, which is placed within a computer as to form a text sting extraction system of this invention.

BRIEF DESCRIPTION OF THE DRAWINGS

A complete understanding of the present invention may be gained by considering the following detailed description in conjunction with the accompanying drawing, in which:

FIG. 10A–C are exemplary views showing the operation steps for the text string extraction system shown in FIG. 1;

FIG. 13 is a flow chart for the text string extraction system in accordance with the second embodiment of the present invention.

DETAILED DESCRIPTION OF THE PREFERRED EMBODIMENTS

Embodiment 1

Figure 1:
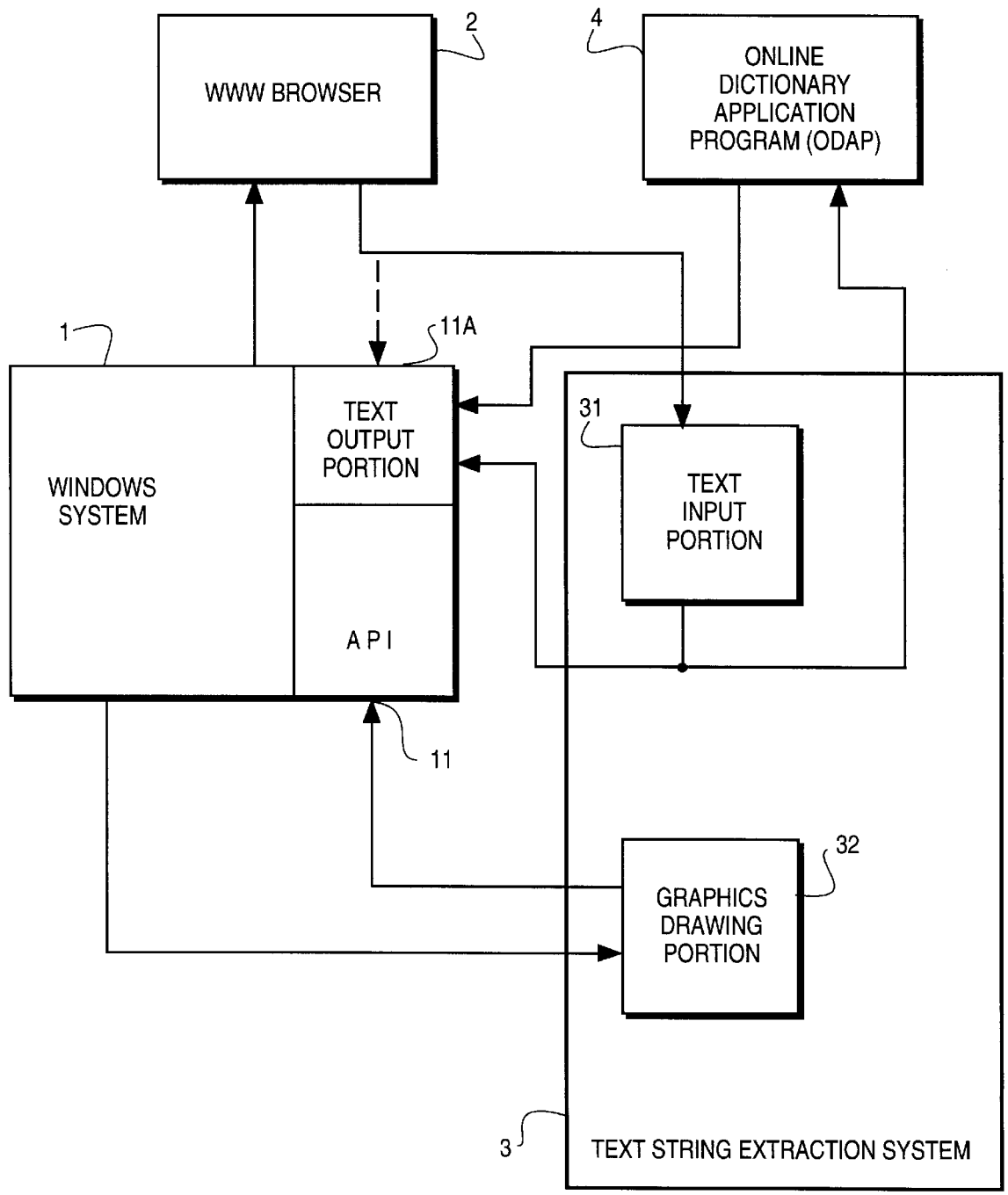
FIG. 1 shows a schematic view of a world wide web (WWW) access system equipped with a text string extraction system in accordance the first embodiment of the present invention.
Figure 2:
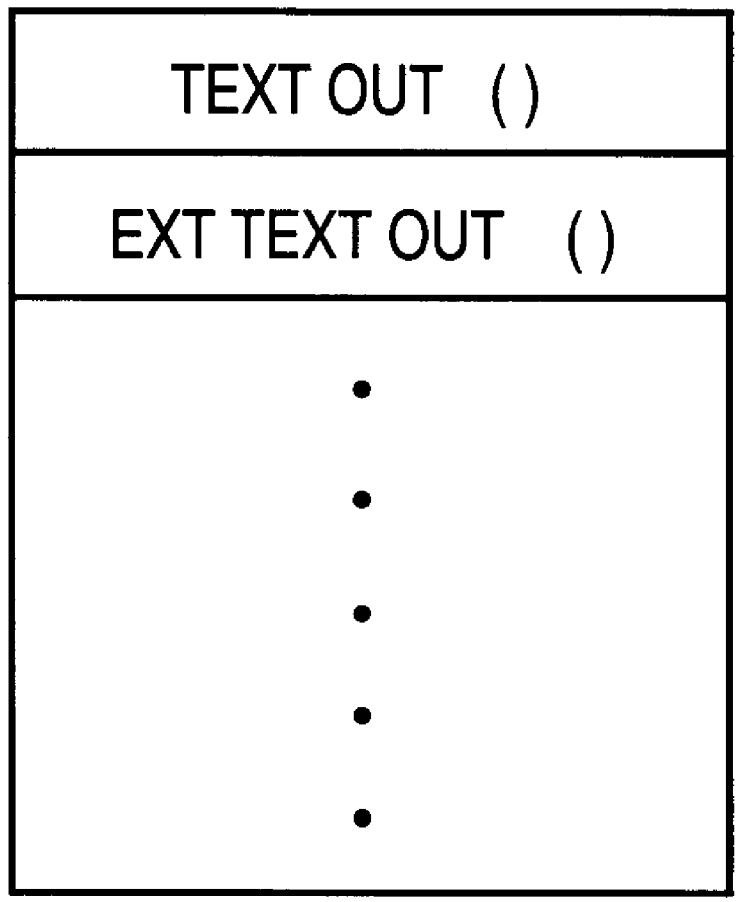
FIG. 2 shows a schematic view of an application program interface.

FIG. 1 showing a schematic view of a world wide web (WWW) access system equipped with a text string extraction system according to the present invention, comprises a Windows system 1, a WWW browser 2, a text string extraction system 3, and an online dictionary application program (ODAP) 4. The Windows system 1 is an operating system with a multitask function and has an application program interface (API) 11 composed of a system function group for calling system functions. The API 11 further comprises a text output portion 11A composed of the functions of TextOut() or ExtTextOut() for displaying text on a screen as shown in FIG. 2. The WWW browser 2 is to be executed on the Windows system to access Web pages and display text on screen via the text output portion 11A of the API 11.

The text string extraction system 3 includes a text input portion 31 and a graphics drawing portion 32. The text input portion 31 outputs the text data from the WWW browser 2 to the text output portion 11A and to the ODAP 4. Such a procedure is different from a normal procedure in which the WWW browser 2 directly outputs the words to the ODAP 4 while the present procedure has the WWW browser 2 to output the word to be searched to the text output portion 11A via the text string extraction system 3, then the word is further transferred to ODAP 4.

In order to achieve this procedure, text string extraction system 3 has the addresses for the TextOut() and ExtTextOut() in API 11 shown in FIG. 2 to be modified to the addresses for the text input portion 31. Such a procedure is called a "hook" process for API.

The graphics drawing portion 32 will draw an invisible dot matrix beside a mouse cursor when the mouse cursor stops on a text string over a predetermined of time period such that the WWW browser 2 at least may output the text pointed by the mouse cursor for display. The drawn dot matrix has an identical color to that of the background of the screen and an identical height to the words, the dot matrix is for example composed of 1*8 dots.

Figure 3:
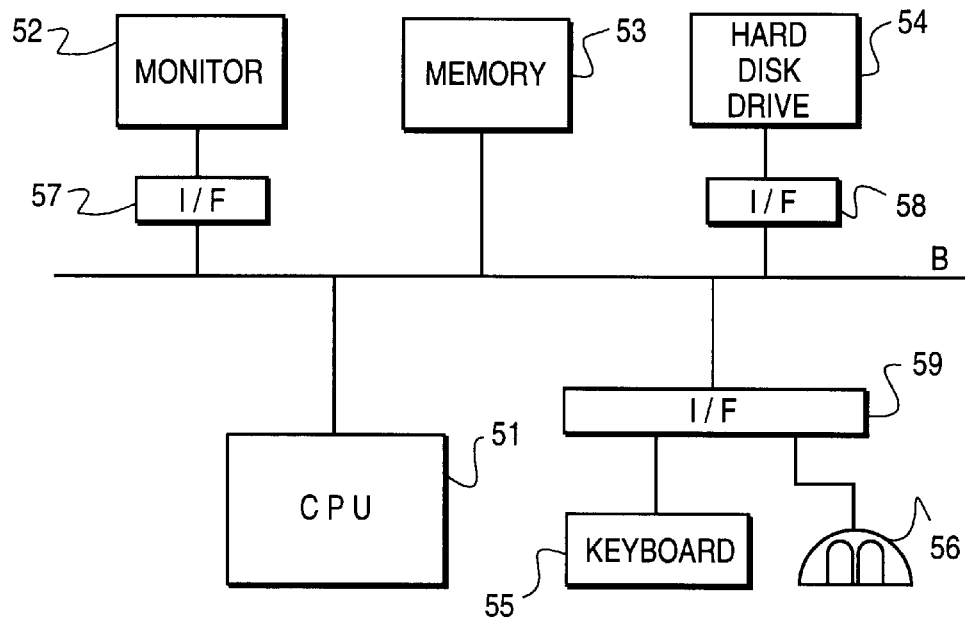
FIG. 3 is a block diagram of the computer system shown in FIG. 1.

The ODAP 4 is to be used as an auxiliary program for the WWW browser 2 to be executed under Windows environment. The ODAP 4 looks up dictionary by means of a word from the text string extraction system 3 and forwards the meaning of the word to Windows system I and displays the word via text output portion 11A. Above-mentioned WWW accessing system is normally achieved by software approach under a computer system as shown in FIG. 3. As shown, the computer system comprises a central processing unit (CPU) 51, a monitor 52 a memory 53, a hard disk drive 54, a keyboard 55, a mouse 56, three interface cards 57, 58, 59, and a system bus B.

Figure 4:
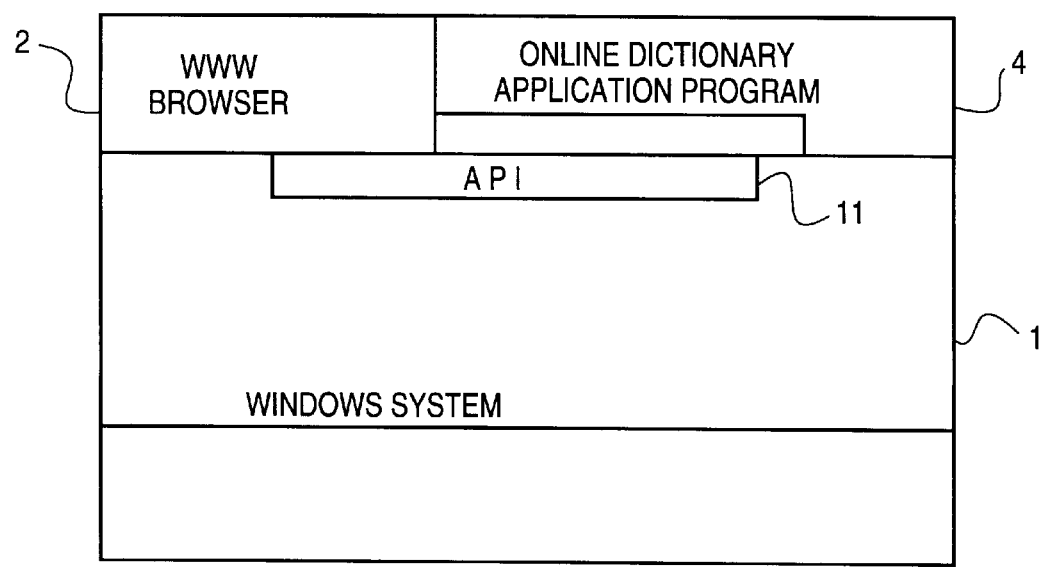
FIG. 4 is a schematic view showing functions implemented by the system shown in FIG. 1.
Figure 5:
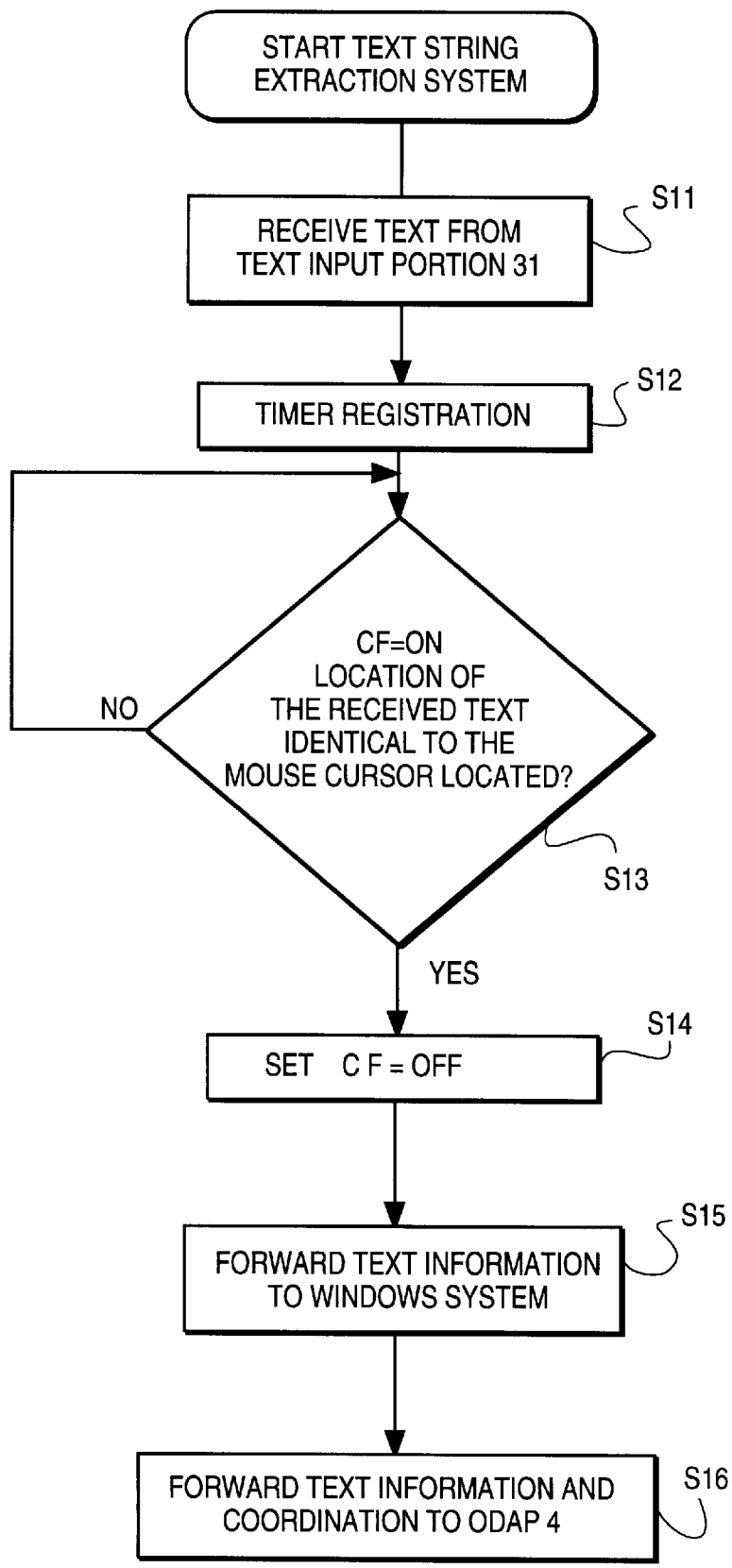
FIG. 5 is a flow chart for the text string extraction system shown in FIG. 1.

The CPU 51 and memory 53 are directly connected to the system bus B. The monitor 52 is connected to system bus B via the interface card 57 while the keyboard 55 and the mouse 56 are connected to the system bus B via the interface card 59. The hard disk drive 54 is connected to the system bus B via the interface card 58. Within the hard disk drive 54, the Windows system 1, the WWW browser 2, the word extraction system (not shown), the text string extraction system 3, the ODAP 4, etc. are stored When the computer system shown in FIG. 3 is activated, the CPU 51 will read the Windows system 1 from the hard disk drive 54 via the interface card 58, then a corresponding message is displayed on the monitor 52 via the interface card 57. The CPU 51 will initiate the setting of the memory 53. Then, the CPU 51 will read the WWW browser 2, the text string extraction system 3, and the ODAP 4 in the hard disk drive 54 and activate these programs in response to entries from the keyboard 55 and the mouse 56. As shown in FIG. 3, the Windows system 1 will control the CPU 51, the monitor 52, the memory 53, the hard disk drive 54, the keyboard 55, the mouse 56, and the interface card 57, 58, 59. As shown in FIG. 4, the WWW browser 2, the text string extraction system 3, and ODAP 4 will operate under Windows environment via the API 11.

FIGS. 5–9 show the operations of the WWW browser of FIG. 1. The Windows system 1 and the WWW browser 2 are assumed to be activated hereinafter. When the text extraction system 3 is activated, the text extraction system 3 is prohibited from receiving text string information from the text output portion 11A of the API 11 but not from the text input portion 31 (step S11), i.e., the API 11 hook the text function (function in the text input portion). In other words, the text output portion 11 A of the API 11 has been replaced by text extraction system 3. Thus, the addresses for the TextOut() amd ExtTextOut() in API 11 as shown in FIG. 2 have been set to the text extraction system 3.

In order to extract a text string, a timer registration is executed to the graphics writing portion 32 (step S12). By this timer registration step, a time event generated in every 100 milliseconds is able to execute a graphics writing process ( i.e., rectangular block writing process) shown in FIG. 6.

Figure 6:
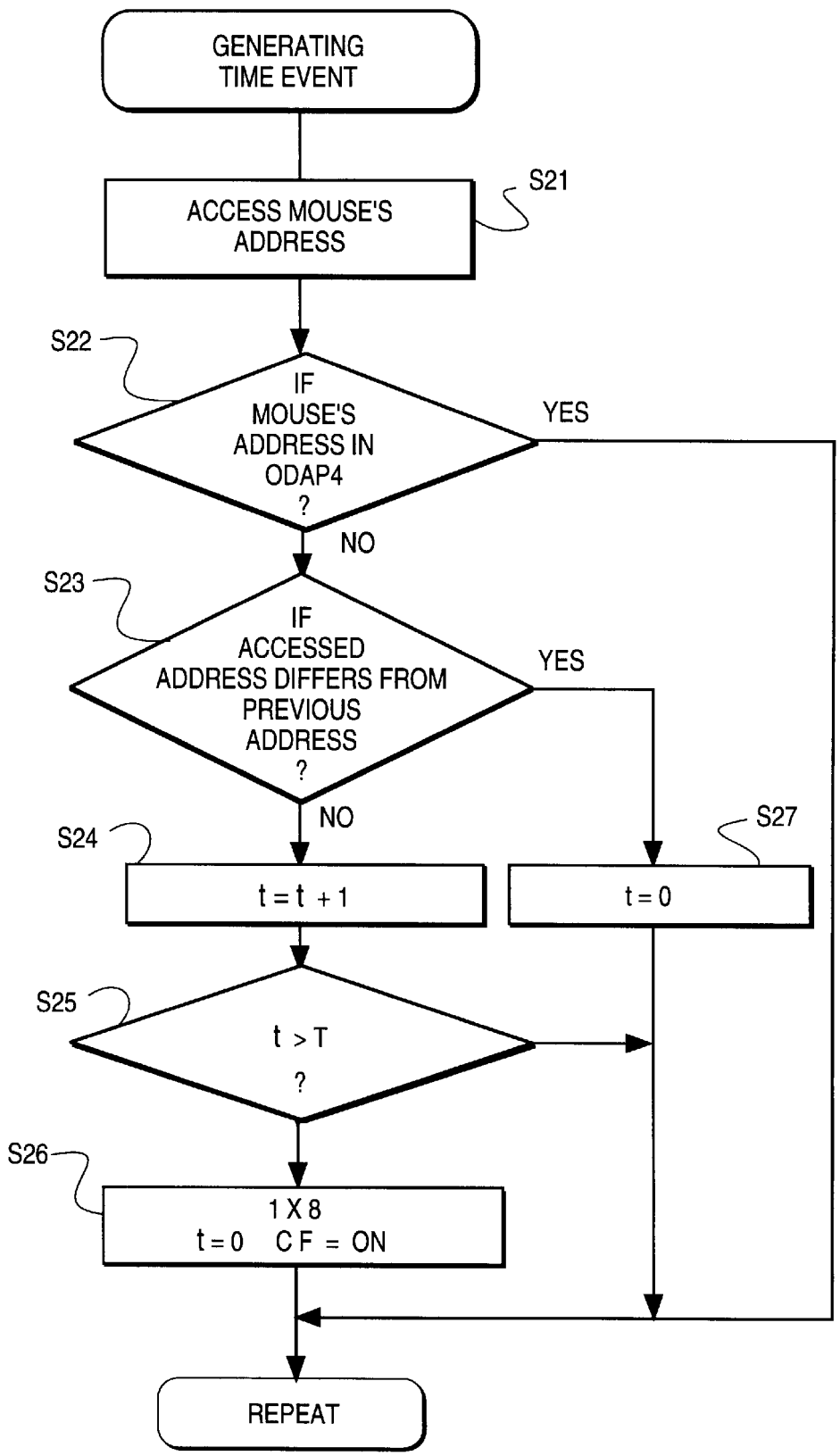
FIG. 6 is a flow chart for the graphics writing process for the text string extraction system shown in FIG. 1.

Referring to FIG. 6, the graphics drawing portion 32 in FIG. 1 will access the address of the mouse's cursor, such as the absolute coordination information (step S21). The text string extraction system 3 will judge whether the accessed address is in the ODAP 4 (step S22), if yes, the process will be closed then back to the main program (FIG. 5), if no, the text string extraction system 3 will judge whether the accessed address of the mouse cursor differs from the address of previous time event (step S23), if no, a time constant t will be incremented by 1 (step S24).

Then the resulting time constant will compare with a predetermined time period T (step S25). If the time constant t is greater than a predetermined time period T, a rectangular block will be provided near the mouse cursor (step S26), then the time constant t is reset to zero. Then, a capture flag (CF) representing a rectangular block have been written and re-accessing text string have been activated is activated to an "ON" state (step S26). Then, the time event generated in every 100 milliseconds will be used to activate block writing. As to the block, it is preferable to be invisible, such as an 1*8 dot matrix in gray or in a background color as shown in FIG. 10B.

As the desired text to be extracted is different from the text displayed, it is desirable to have three lines of text to be extracted by the text string extraction system 3. In this case, the dot matrix will be across several lines. If the WWW browser 2 outputs graphic information in a line of words then if a dot matrix of 400*8 is written, a line of text string will be output.

Returning to step S23, if the accessed address of the mouse cursor is different from that of the previous time event, then it is assumed that the mouse cursor is moving, thus, the time constant t is reset to zero (step S27) and the graphic process is ended. If the time constant t is not greater than the predetermined time period T, the mouse cursor will be deemed temporary stop and the graphics writing process is ended.

Figure 7:
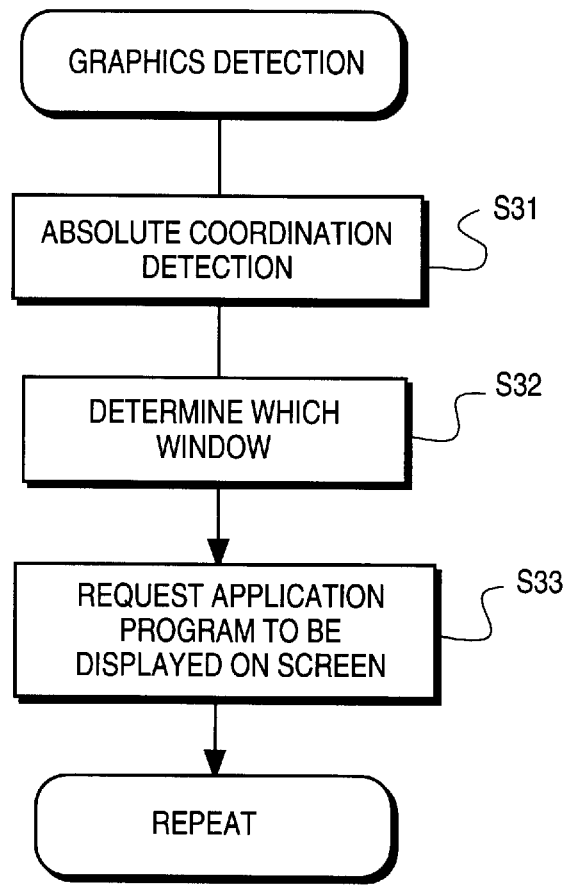
FIG. 7 is a flow chart for detecting the drawing procedure for the text string extraction system shown in FIG. 1.
Figure 8:
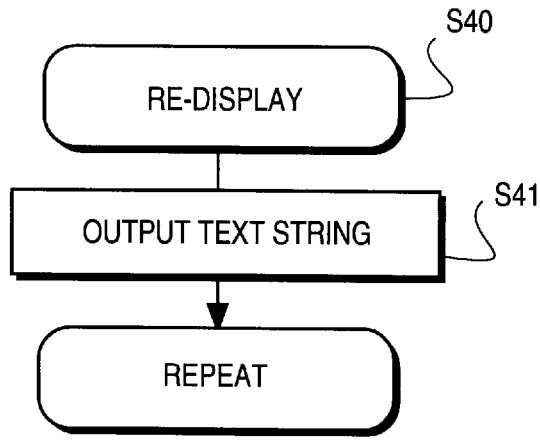
FIG. 8 is a flow chart for the re-displaying procedure for the text string extraction system shown in FIG. 1.

Windows system 1 will execute a detection for graphics writing process as shown in FIG. 7 at all times, i.e., if a graphic to be displayed is detected by the windows system 1, an absolute coordination detection will be executed (step S31). Then, determining a window having a block writing position based on the absolute coordination and a plurality information acquired from the windows system (step S32). Then, the windows system 1 will enable at least part of the application program having the block writing position, i.e., the WWW browser 2 to be displayed on screen (step S33). Once the WWW browser 2 receives a re-display instruction from the windows system 1 (step S40) as shown in FIG. 8, a corresponding portion of the text string will be output (step S41).

Referring back to FIG. 5, in step S11, the addresses of TextOut() and ExtTextOut() of the API 11 is set to the addresses of text input portion 31. Therefore, WWW browser 2 will output the text string to be displayed to the text string extraction system 3. After the text string extraction system 3 executes timer registration (step S12), the text string extraction system 3 will wait for the text string information from the WWW browser 2 (step S3). Once the text string information from the WWW browser 2 is received by the text string extraction system 3, the CF flag will be activated to "ON" state and the text string extraction system 3 will judge if the location of the received text information identical to the position that the mouse cursor located (step S13).

If the result of the step S13 is "NO", i.e., the CF flag is OFF state and/or the location of the received text string information is different from that of the mouse cursor located, then the text extraction system 3 will wait for next text string information. If the result of the step S13 is "YES", i.e., the CF flag is ON state and the location of the received text string information is identical to that of the mouse cursor located, the text string extraction system 3 will set the CF flag to OFF state (step S14) and then retrieve the hooked function, i.e., set the addresses of text output portion 11A into the TextOut() and ExtTextOut() and forward the text string information to the windows system 1 via text output portion 11A (step S15). Windows system 1 will display the received text string information on a corresponding location of the screen. Text string extraction system 3 then forwards the text string information received from the WWW browser 2 and the coordination of the mouse cursor to the ODAP 4 (step S16). The steps S13 to S15 will be repeated as long as the text string extraction system 3 is in operation.

Figure 9:
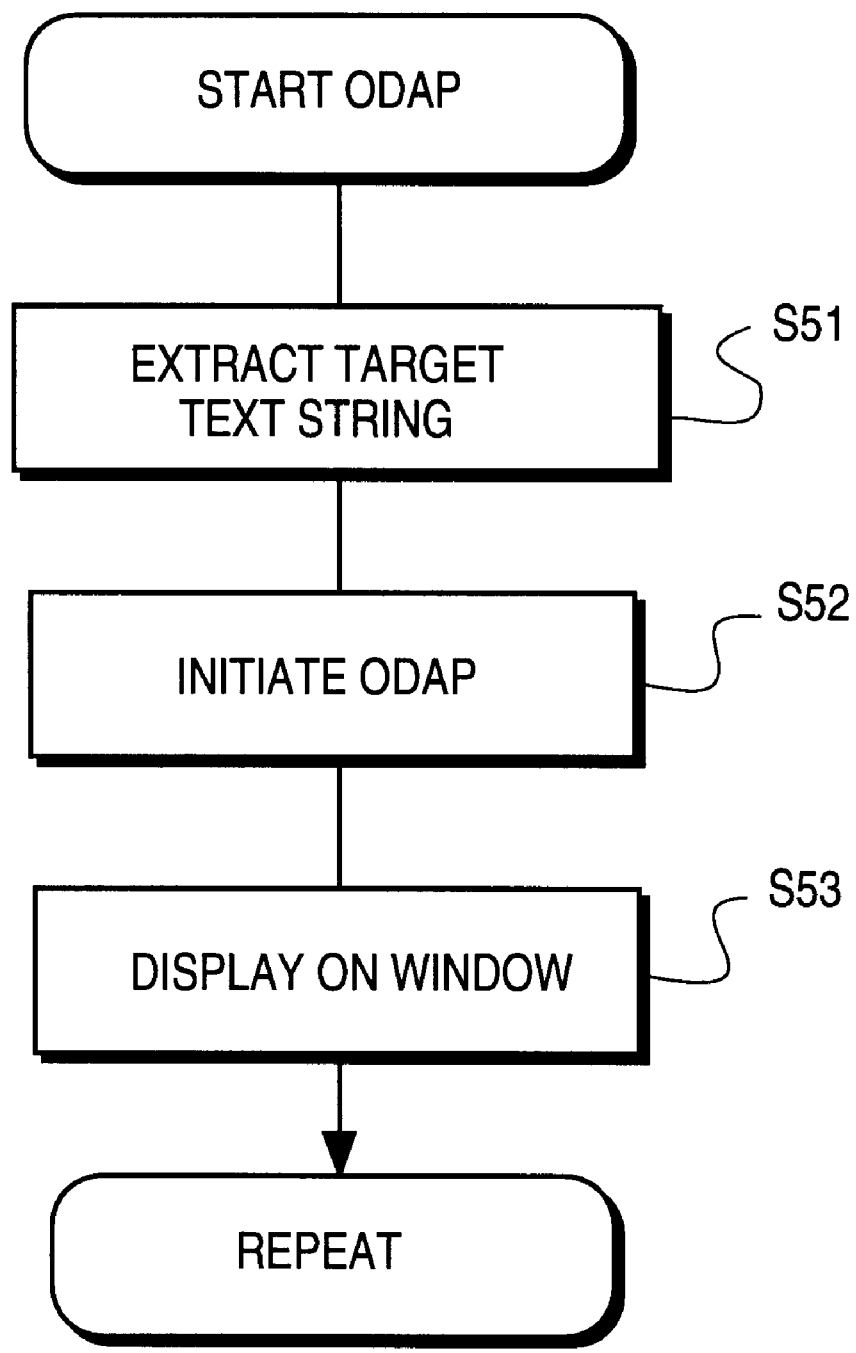
FIG. 9 is a flow chart for the dictionary index procedure for the text string extraction system shown in FIG. 1.

FIG. 9 shows an flow chart for the operations for the ODAP 4. When the ODAP 4 receives the text string information and the coordination of the mouse from the text extraction system 3, a target text string will be extracted from the information (step S51). If the target text string is in English or German etc., the ODAP 4 will search the word pointed by the mouse cursor or blocked by space, tab sign, comma, or period, etc. If the target text string is in Chinese or Japanese word, the word pointed by the cursor will be a header and the ODAP 4 will search for a predetermined number of words to be the target text string. If such a target text string does not map to a suitable object word, the number of the target text string will gradually be deducted by 1 until a suitable object word is found.

Then the extracted target text string is utilized to initiate the ODAP 4 (step S52). The search result from the ODAP 4 is provided to the text output portion 11A of the API 11. The search result is then displayed on a suitable window by the Windows system 1 (step S53). The function hooked the text input portion 31 deems the text input portion 31 as an supply object for the text string information.

Referring to FIG. 10A, in case of the main application program shows "This is a pen", wherein "This" is pointed by the mouse cursor. If the cursor points on "This" over a predetermined period, such as 400 ms the S24 will determined that t is greater than T, accordingly, a "1*8" dot matrix will be placed beneath "h" as shown in FIG. 10B. Such a dot matrix will be detected by the Windows System 1 which then instructs the main application program to display an area containing "This is a pen".

The main application program (WWW browser 2) then output the text string information (display data) (step S41) containing "This is a pen" in response to the instruction from the Windows System 1. Such a text string information will be provided to text string extraction system 3 rather than the text output portion 11A of the API 11. The text string information received by the text string extraction system 3 is then transmitted to the text output extraction 11A of the API 11 (step S15). The Windows system 1 then restores the display data, accordingly, the displayed information will restore to its original status as shown in FIG. 10A.

The text string extraction system 3 then transmits the text string information (such as text position information and cursor position information etc.) and the position information of the cursor to the ODAP 4. The ODAP 4 then derives that the cursor is pointed to a letter "h" of "This is a pen" based on the text string information, the text position information, and the cursor position information.

The ODAP 4 then forward and backward searches the terminal text from the "h" letter and finds a terminal text respectively existing in front of the letter "T" and after the letter "s". Thus, the word "This" will be extruded as search target text string (step S51). Thus, an English Japanese dictionary will look up the word "This" and has a corresponding meaning, "" in Japanese (step S52). The ODAP 4 then outputs the word "This" and the Japanese character "" to the text output portion 11A of the API 11 (step S53). The Windows system 1 will display "This" on a location beneath the cursor and "" provided by the ODAP 4 on the right-handed side of "This" as shown in FIG. 10C.

Accordingly, as long as the mouse cursor points any arbitrary text string, a corresponding word will be extruded from the string. After looking up the ODAP 4, a corresponding result will be shown on the display.

Embodiment 2

Next, a second embodiment in accordance with this invention is described.

The fundamental structure of this embodiment is similar to that of the first embodiment except that the procedure of drawing a dot matrix and text string extrusion is different from that of the first embodiment.

Figure 11:
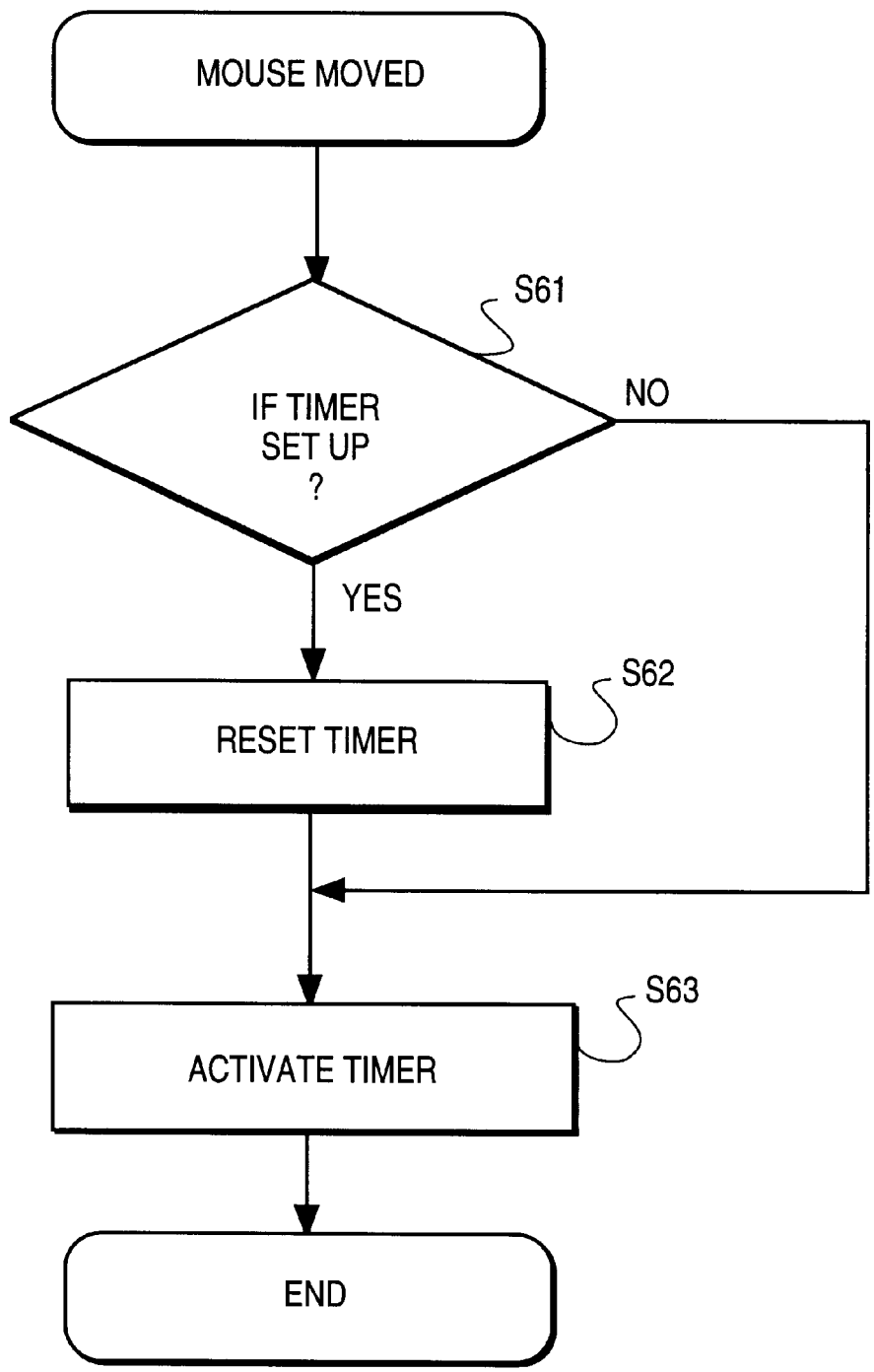
FIG. 11 and 12 are flow charts for the drawing procedure in accordance with the second embodiment of the present invention.
Figure 12:
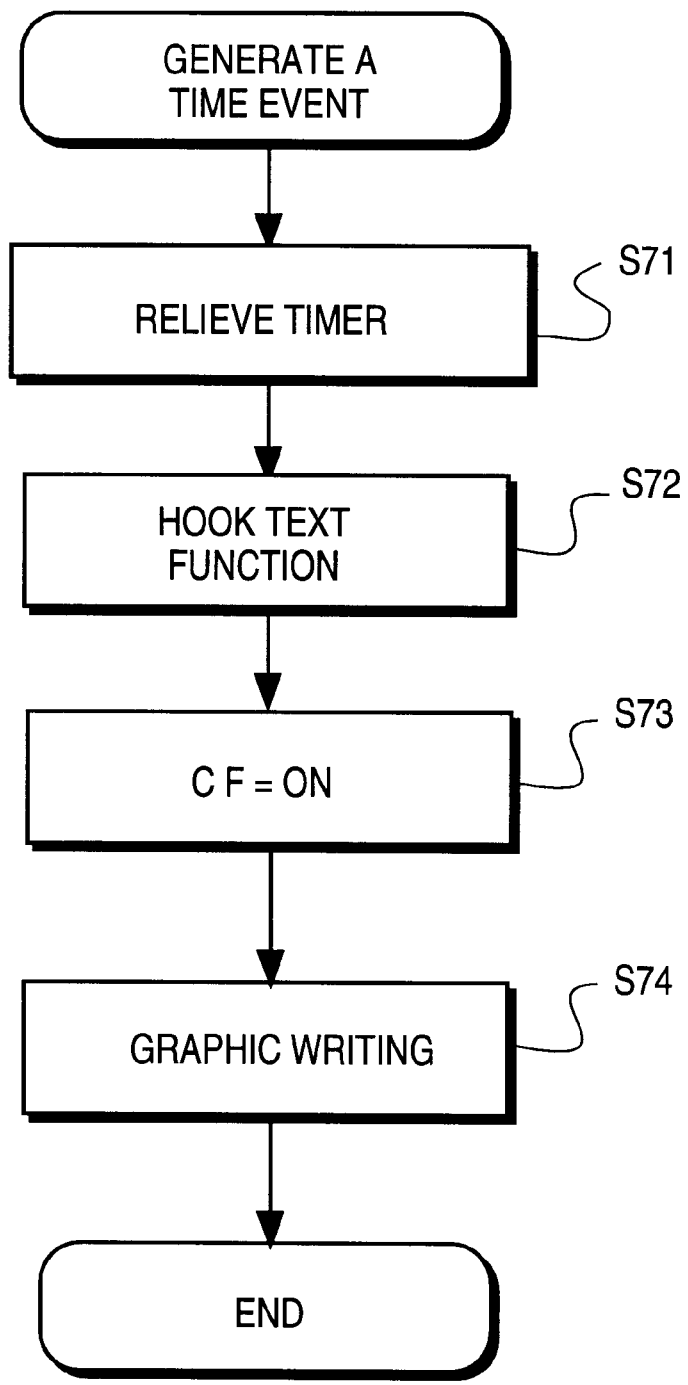

Referring to FIG. 11, if the mouse cursor is moved, the Windows system 1 will judge whether a timer has been set up (step S61), if the timer has been set up, the timer will be reset (step S62). If a timer is not set up or the timer is in a "reset" state, the timer will be activated (step S63). Referring to FIG. 12, when the timer is activated, only when the mouse stop over a predetermined period, e.g., 300 ms, the timer will stop counting and then generates a "time event". Once the "time event" is generated, the graphics writing portion 32 will relieve the timer (step S71). The functions (text functions) of the text input portion 31 is hooked for supplying the text string information output from the main application program to the text input portion 31 (step S72). Then, ending the procedure by writing the graphics into the cursor portion (step S73).

Due to this graphics procedure, the main application program (WWW browser program) output text string information for re-displaying. As the text function is hooked at step S72, text string output from the main application program (WWW browser 2) is provided to the text input portion 31. The text input portion 31 will determine whether the supplied text string is the text string within its own window (step S81). If the supplied text string is within its own window, the text function hooked will be restored (step S82) and then stop processing. If the supplied text string is not within its own window, a determination will be made by judging whether the CF flag is "OFF" (step S83). If yes, the hooked text function will be restored and end the process. If no, i.e., the CF flag is "ON", then access the supplied text string (step S84). The accessed text string is then transmitted to the ODAP 4 (step S85) and the CF flag is then reset to "OFF" state (step S86). Then, the text function hooked will be restored (step S82) and then stop processing.

During step S85, the ODAP 4 extrudes search text string from the supplied text string and executes a search thereby deriving a search result. As the hooked was restored in step S82, the search result will be forward to the text output portion 11A of the API 11 and displayed.

In the first embodiment, the Windows system will generate a time event at a predetermined period for executing the graphics writing process. However, in the second embodiment, only when the mouse stops for over a predetermined period then a time event will be generated and a graphics writing is then executed. Thus, this will cause less disturbance to the system.

Additionally, the second embodiment will also have a reduced number of "hook/off-hook" of the text function in comparison with the first embodiment. Thus, this will cause less disturbance to the system.

This invention is not confined to the above-mentioned embodiments, it can be made by various modification and suitable to many applications.

Such as, the previous mentioned main application program 2 is described with a WWW browser. However, other application program may also be suitable, such as, word processing program, spreadsheet program, or data base program, etc.

Further, the auxiliary application program is not confined to the ODAP 4, it can also be applied to data base search application program, data input application program, etc.

In the above description, a dot matrix data is written into a cursor position to enable the application program to output text string, however, other approaches may also be applied as long as the application is able to output text string.

Additionally, this invention does not limit the extruded text string to be searched in the ODAP 4, the text string pointed by the cursor may also be copied, deleted, or replaced, etc.

Further, if the terminal text is a period or a question mark, a complete sentence will be extruded.

Though this invention read the programs stored in the hard disk drive, those skilled in the art will appreciate that one way access the programs from communication media then download the programs into the computer.

What is claimed is:

1. A text string extraction system for a computer system having a display, an operating system means having an application program interface with text output portion, a cursor for moving on the display, and application program means for executing application programs on said operating system and outputting text strings onto said operating system via said text output portion so as to display said text strings on the display, said extraction system comprising:

drawing means for drawing a symbol on a location pointed by the cursor by sending a rectangular matrix to the application program interface then having said operating system means output a signal to an application program and having said application program output a text string to be re-displayed; and input means for extracting a text string beside said location pointed by the cursor by receiving the text string to be re-displayed output from said application program thereby supplying said input text string to the operating system via the text output portion for re-displaying.

2. A text string extraction system for a computer system having a display, an operating system means having an application program interface with a text output portion, and a cursor for moving on the display, application program means for executing an application program on said operating system and outputting text strings onto said operating system via said text output portion so as to display said text string on the display, said extraction system comprising:

drawing means for drawing a symbol on a location pointed by the cursor by sending a rectangular matrix to the application program interface and having said application program output a text string to be re-displayed on a predetermined address;

and input means for extracting a text string beside said location pointed by the cursor by receiving the text string to be displayed output on the predetermined address from said application program thereby supplying said input text string to the operating system via the text output portion for re-displaying.

3. A text string extraction system as claimed by claims 1 or 2, wherein said drawing means includes means for writing an invisible dot matrix onto said location pointed by said cursor.

4. A text string extraction system as claimed in claim 3 further comprising word extraction means for extracting a word sandwiched by terminal words beside the cursor from the text strings received by said input means.

5. A text string extraction system as claimed in claim 3 further comprising word extraction means for extracting a word pointed to by the cursor from the text strings received by said input means.

6. A text string extraction system as claimed in claims 1 or 2 further comprising word extraction means for extracting a word sandwiched by terminal words beside the cursor from text strings received by said input means.

7. A text string extraction system as claimed in claim 4 further comprising a dictionary application program for searching a respective meaning of the extracted word but not having the searched result provided to the said display means via said input means.

8. A text string extraction system as claimed in claims 1 or 2 further comprising word extraction means for extracting a word pointed to by the cursor from the text strings received by said input means.

9. A text string extraction system as claimed in claim 8 further comprising a dictionary application program for searching a respective meaning of the extracted word but not having the searched result provided to the said display means via said input means.

10. A text extraction system for a computer system having a display, application programs for displaying a plurality of text strings on the display, and cursor displaying means for displaying a cursor on the display and moving the cursor in response to external operations, said text extraction system comprising:

re-output means for having said application programs re-output the text string on a predetermined location pointed to by said cursor;

extracting means for receiving said text string from said application program in response to said re-output means and extracting said text string beside said cursor based on the inputted text string the location pointed to by said cursor and a predetermined condition of the text string.

11. A text string extraction system for computer system having a display and an operating system executing means for executing an operating system having an application program interface with a text output portion for displaying a text string on the display, said extraction system comprising:

a text string extraction portion for replacing part or all of the text output portion of said operating system, receiving a display information from said application program, supplying the received display information to said operating system, and extracting the text string contained within said received display data.

* * * * *